Dec. 29, 1964     G. P. DENEAU     3,163,467
RETRACTABLE SAFETY BELT
Filed June 7, 1962     2 Sheets-Sheet 1
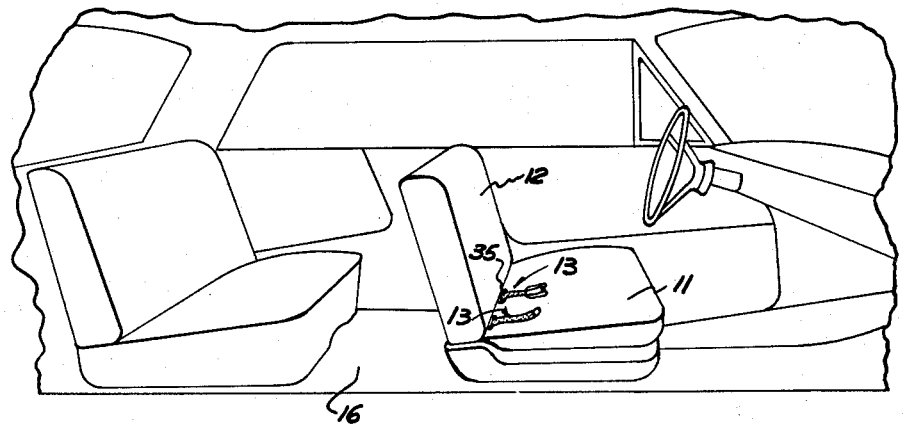
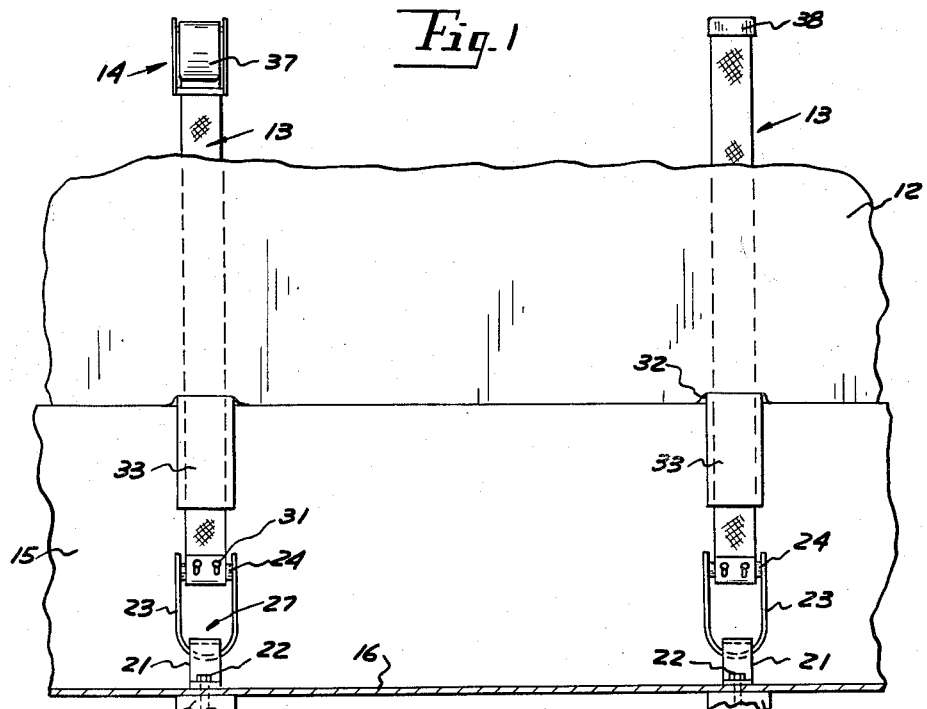
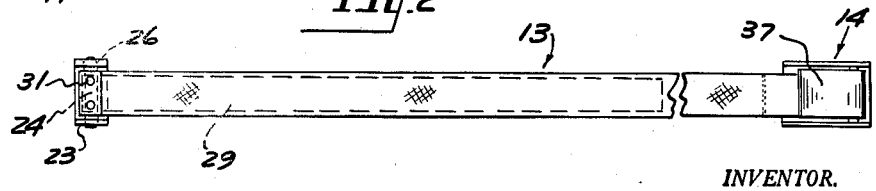
INVENTOR.
GORDON P. DENEAU
BY
ATTORNEY

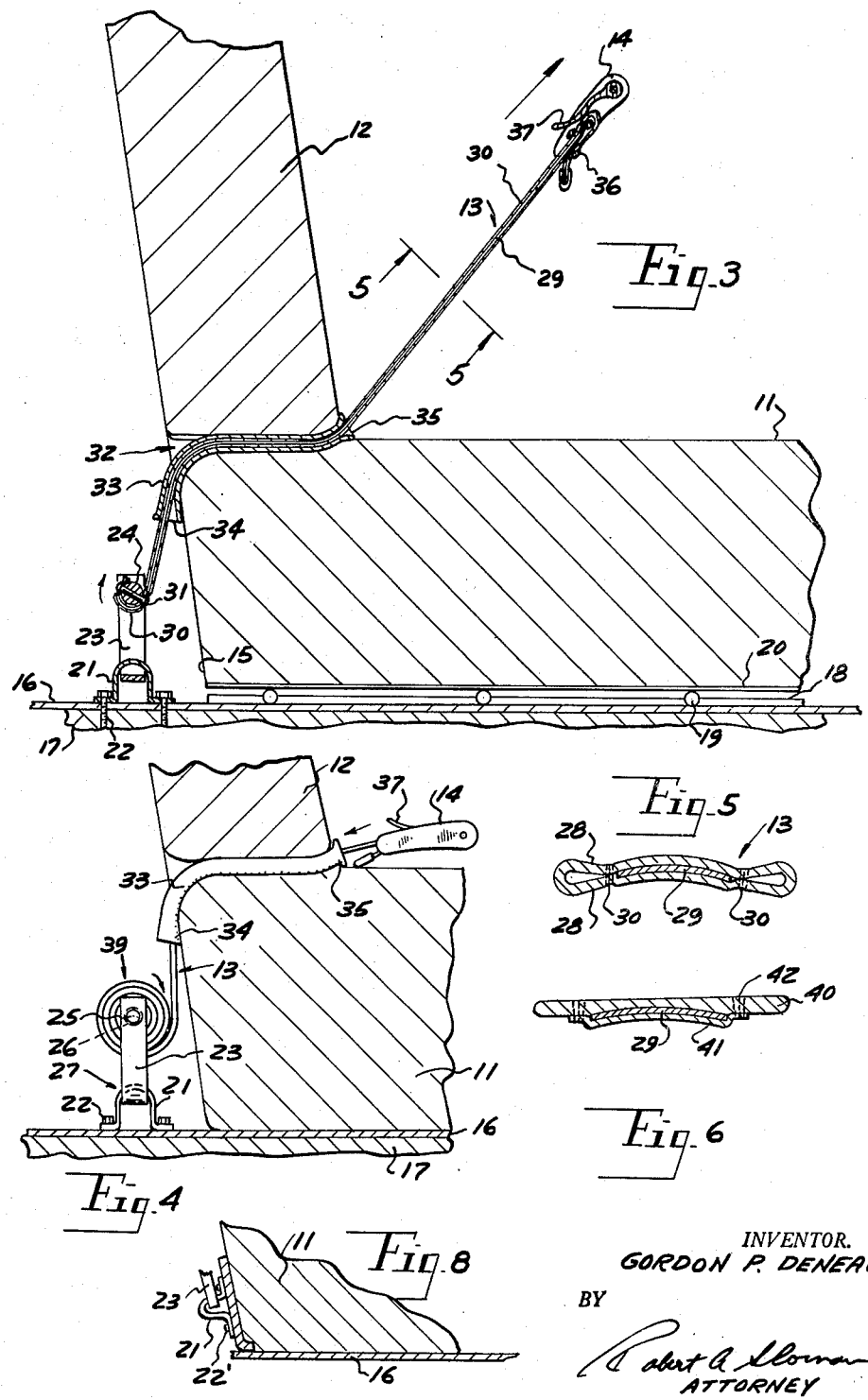

United States Patent Office 3,163,467
Patented Dec. 29, 1964

3,163,467
RETRACTABLE SAFETY BELT
Gordon P. Deneau, Birmingham, Mich., assignor to Charles A. Dean, Birmingham, Mich.
Filed June 7, 1962, Ser. No. 200,860
18 Claims. (Cl. 297—388)

The present invention relates to a retractable safety belt for vehicles, and more particularly to a belt with such structure built thereinto as to cause the belt to automatically retract when not in use.

Heretofore, particularly in vehicles such as automobiles, the safety belt when not in use, normally lies extended over the seat, is in the way, presents a sloppy appearance, or interferes with entering and leaving the vehicle, and is otherwise objectionable in its non-use position.

Heretofore various efforts have been made to provide a means for retracting the safety belt when not in use. One of the most popular means is to employ a spring loaded drum and wherein the safety belt is wound around the drum in tension and accordingly upon release of the belt to a non-use position, it will retract around the drum with the springs effective for rotating the drum and rewinding the belt.

The objection with this construction is that this method of mounting the drum is unreliable as it provides a yielding anchoring means for the belt, if not completely unwound and further because the springs have a tendency to wear out from time to time, because the springs are not fully effective for the intended purpose, often produce an unsightly or bulky appearance.

To overcome these objections, it is the primary object of this invention to provide a retractable safety belt with the resilient means for retracting the belt built into and connected directly with the belt.

It is the object of the present invention to provide within the safety belt and anchored therein a flexible resilient self-winding spring steel strip so that there is a self-winding characteristic built into the safety belt.

It is another object of the present invention to provide a suitable journal support, or roller support for one end of the belt and spring steel insert, or strip, which may be suitably anchored to the vehicle frame, and which upon release position will automatically rewind in a coil upon and around the roller support.

Since in many, if not most vehicle constructions today, the backrest overlies the seat, being reasonably close thereto, if not in contact therewith, normal frictional forces may prevent the belt from retracting automatically as intended.

For this purpose it is an object of the present invention to provide a tubular type of guide means for which the retractable belt is movably and guidably supported to facilitate retraction when not in use.

These and other objects will be seen from the following specification and claims in conjunction with the appended drawings, in which:

FIG. 1 is a fragmentary perspective view of the interior of a vehicle showing a pair of seat belts in retracted position.

FIG. 2 is a fragmentary rear elevational view of the seat and a portion of the backrest showing a pair of cooperating belts in fully extended position completely unwound.

FIG. 3 is a vertical section through the seat and backrest showing the mounting of the retractable seat belt and guide means therefor, the said belt being shown in "fully extended use" position.

FIG. 4 is a fragmentary section, but similar to FIG. 3, illustrating the seat belt in fully retracted position.

FIG. 5 is a section taken on line 5—5 of FIG. 3, on an increased scale.

FIG. 6 is a view similar to FIG. 5, showing a different method of mounting the spring steel insert with respect to the safety belt.

FIG. 7 is a plan view of the safety belt, as fully extended to "use position."

FIG. 8 is a fragmentary section showing the anchoring means secured to the seat.

It will be understood that the above drawings illustrate merely a preferred embodiment of the invention, and that other embodiments are contemplated within the scope of the claims hereinafter set forth.

Referring to the drawings, the present retractable safety belt is shown in FIG. 1 in its retracted position upon the seat 11, and below the backrest 12, said retracted belts being generally indicated at 13, the vehicle floor being indicated at 16.

The structure and relationship of the parts, as best shown in FIG. 3 wherein it is seen that the belt 13 extends through a guide tube 33, normally projected between the lower edge of the backrest and the top surface of the seat 11 at its rear portion, as indicated at 32, the vehicle floor 16 being mounted upon a conventional framework or body 17, fragmentarily shown.

FIG. 3 shows the vehicle seat 11 as a front seat of a vehicle, normally spaced above the floor with respect to the guides 18 and 20 and with suitable friction minimizing means such as rollers 19 interposed therebetween, as merely illustrative of one means for mounting the front seat of a vehicle for adjustments thereon in a conventional manner, but forming no part of the present invention.

A pair of inverted U-shaped brackets 21 are positioned rearwardly of the rear surface 15 of the seat, and fixedly secured to the frame 17, as by suitable fastening means 22, which may be bolts, lugs, or studs, providing a permanent anchoring means. The said brackets 21 are spaced laterally behind the rear portion 15 of the seat 11, as shown in FIG. 2, and movably receive as at 27 the bights of the U-shaped stirrups 23, whose free parallel upper end portions supportably journal the support roller 24, whose free ends 25 project through the stirrup, as shown in FIG. 4, there being suitable nylon or Oilite bearings interposed, as at 26, FIG. 7.

The present safety belt, generally indicated at 13, is constructed of a suitable strong and flexible material, such as nylon, and may be constructed in several ways.

For example, in FIG. 5, the nylon webbing 28 is in the form of a tube, which is flattened. An elongated self-winding resilient spring steel strip 29 is projected into the tube defined by the elements 28, and is retained therein by the series of stitching 30, which extend through the tubular portions 28 along the length of the resilient strip 29, for anchoring the said resilient strip within the tubular webbing 28.

As shown in FIG. 7, the resilient strip 29 extends along the belt throughout a portion of its length, and beyond the end of the strip 29 there is a portion of the belt, independent of the said strip, which carries at its outer end a conventional safety belt latching device 37.

The other end of the resilient strip 29 extends to the end of the webbing 13, partly around the roller support 24 and both ends are fixedly secured thereto by the transverse rivets 31, FIG. 3.

By the construction shown in FIG. 3, it is seen that the resilient spring steel strip 29 is not only anchored to the end of the flexible webbing 13, forming a part of the safety belt, but is also fixedly secured to the roller support 24.

It is contemplated that the present retractable safety belt may be employed for movement freely between the backrest 12 and seat 11. However, in many situations, th backrest 12 is closely adjacent or bears against the top of the seat, which would normally frictionally impede retracting movements of the safety belt.

For this purpose, and as shown at 32, FIG. 3, an elongated formed guide tube 33 is projected as at 32 between the lower edge of the backrest and the top of the seat to guidably and loosely receive the retractable seat belt 13 for unwinding as well as automatic rewinding movements, such as to the wound retracted position, as shown at 39, FIG. 4.

The tube 33, which may be constructed of platisc material, or may be a metallic tube, has a throated outwardly tapered end 34 at the rear of the seat and an additional throated inlet opening 35 at its forward end to guidably receive the said seat belt, which is shown in fully extended position in FIG. 2, 3, and 7, and in retracted in position in FIGS. 1 and 4.

The free end portion of the seat belt 13, beyond the strip 29, as shown in FIG. 7, has suitably mounted thereon, a conventional type of clasp 14 to which the outer free end of the belt is anchored as at 36. The clasp has the conventional pivotal hasp 37, which is adapted to cooperatively receive a capped end 38, FIG. 2 of the other seat belt for clamping therethrough in a conventional manner.

A slightly different form of seat belt construction is shown in FIG. 6 wherein the seat belt consist of an elongated strip 40 of nylon, or the like and wherein the flexible normally coiled self-winding resilient strip 29 is positioned in its unwound condition along one surface of the said strip 40 and retained thereon by an elongated fabric strip 41.

For this purpose there is employed an elongated strip 41 which consists of nylon or other strong material, which along its opposite longitudinal edges is fixedly secured to the webbing 40, as by a series of stitching 42, which extends upon opposite sides of the said strip 41, and along the length of the insert strip 29, adjacent its longitudinal edges.

By this construction the spring steel self-winding member when released from an extended use position, as shown in FIG. 3, will automatically retract to a normal coiled position, as shown at 39, FIG. 4. Due to the inherent resiliency of the spring steel member, which in its normal inoperative position would be in the nature of a coil, as shown in FIG. 4, and due to the fact further that the end of the said strip 29, as well as the end of the belt 13, are anchored to the roller support 24, as by the rivets 31 which extend therethrough, it is seen that when the said seat belt is released it will automatically retract and wind upon the roller 24 with the roller turning, due to the inherent resiliency and tendency of the spring steel strip 29 to rewind to the form of a coil.

The strip being inserted with respect to the webbing of the belt, the insert 29 would normally take a tightened coil form, corresponding to that shown in FIG. 4. To assembly the same within the webbing of the belt, the said strip 29 must be flattened out for securing to the webbing of the belt, as for example in either of the manners shown in FIGS. 5 and 6.

From a review of FIGS. 5 and 6, it is seen that the spring steel strip 29 is transversely arcuate. This factor increases the strength and resiliency of the strip, and at the same time serves as a guide in the sense as the strip as covered by the fabric or webbing of the belt rewinds into a coil such as shown at 39, FIG. 4, the elements or turns in the coil will tend to nest within one another so that the winding is done in a plane substantially at right angles to the axis of rotation of the roller.

In the "use position" of the seat belt, it is seen that the belt itself must be fully extended, as shown in FIG. 3, so that pulling forces are transmitted directly through the metallic strip 29, as well as the belt to the roller 24, and in turn through the stirrup 23 and bracket 21, directly to the vehicle body or frame 17 in a non-yielding relationship.

It is contemplated as a part of the present invention that the principle involved may be employed for any elongated webbing where is is desired that the use be automatically retractable. It is not necessarily limited to seat belts.

In accordance therefore the primary object of the present invention is that the belt is automatically retractable when not in use without any exterior mechanical aid other than its own ability to recoil from a fully or partially extended position to the retracted position shown at 39, FIG. 4.

The spring steel employed is concaved, as shown in FIGS. 5 and 6, and is suitably tempered for an indefinite period, at least equal to, if not longer than the length of the belt itself. Furthermore the spring steel insert in no way hinders or affects, or reduces the life of the webbing 28 or 42, which forms a part of the retractable seat belt 13.

In the present illustrative embodiment of the invention, and employing a nylon webbing, the same will withstand tests of possibly 5,000 pounds per square inch, or more, and with extra strength due to the spring steel webbing itself, which is sewn into or otherwise secured to the webbing.

Accordingly, by this construction, the retractable seat belt should withstand at least twice the required pounds per square inch, as above specified.

While only one set of seat belts are shown in FIG. 1, it is contemplated that the present construction may provide for any desired number of sets of seat belts, such as two for the front seat of the vehicle and two for the rear seat. The anchoring means 21–23 of FIG. 4 may be directly secured to the vehicle frame by being attached to the vehicle seat 11, as shown fragmentarily at 22' FIG. 8.

Having described my invention, reference should now be had to the following claims.

I claim:

1. In a retractable safety belt for vehicles having a frame, an anchoring means fixed to the frame, a roller support journaled upon the anchoring means, an elongated flexible safety belt, an elongated self-winding resilient strip mounted along a portion of the length of said belt, and means fixedly securing one end of said belt and strip to said support, said belt and strip when not in use being coiled around said support.

2. In a retractable safety belt for vehicles having a frame, an anchoring means fixed to the frame, a roller support journaled upon the anchoring means, an elongated flexible safety belt, an elongated self-winding resilient spring steel strip mounted along a portion of the length of said belt, and means fixedly securing one end of said belt and strip to said support, said belt and strip when not in use being coiled around said support.

3. In the retractable safety belt of claim 2, said belt when in use being fully uncoiled to transmit pulling forces directly to said frame.

4. In the retractable safety belt of claim 2, said spring strip being transversely arcuate, said belt and strip on release from a position of use automatically coiling up rotating said support upon said anchoring means, the turns of said resilient strip being guidably and cooperatively nested for automatic rewind in a single plane.

5. In the retractable safety belt of claim 2, said belt being of flattened tubular form, said strip in uncoiled form snugly nested throughout its length within the belt and secured therein.

6. In the retractable safety belt of claim 2, said belt being of flattened tubular form, said strip in uncoiled form snugly nested throughout its length within the belt and secured therein, said strip being laterally narrower than said belt, the securing of said strip consisting of stitching through said belt closely adjacent outer edges of said strip throughout its length.

7. In the retractable safety belt of claim 2, said belt being substantially planar in form, said resilient strip bearing against and along one surface of the belt, and an elongated retaining strip overlying said strip and at its edges stitched to said belt throughout the length of said strip and upon opposite sides thereof.

8. In the retractable belt of claim 2, said anchoring means including a U-shaped bracket fixed to said frame, and a U-shaped stirrup flexibly connected with said bracket, the free ends of said stirrup receiving and journaling said support.

9. An elongated retractable webbing mountable upon a support, comprising an anchoring means fixed to said support, a roller support journaled upon said anchoring means, an elongated flexible webbing, an elongated self-winding resilient strip mounted along a portion of the length of the webbing, and means fixedly securing one end of said webbing and strip to said support, said webbing and strip when not in use being coiled around said support.

10. In a retractable safety belt for vehicles having a frame, a seat assembly secured to said frame, an anchoring means fixed to the seat assembly, a roller support journaled upon the anchoring means, an elongated flexible safety belt, an elongated self-winding resilient spring steel strip mounted along a portion of the length of said belt, and means fixedly securing one end of said belt and strip to said support, said belt and strip when not in use being coiled around said support.

11. Self-retracting safety seat belting comprising an elongated flexible belt webbing, and an elongated self-retractable strip mounted along said webbing longitudinally of the latter, adjacent ends of said webbing and strip being attachable to a support to transfer tensile forces imposed on the other end of said webbing through the latter to said support independently of said strip.

12. The self-starting safety seat belting as defined in claim 11, wherein said strip is formed of self-winding yieldable spring steel.

13. The self-retracting safety seat belting as defined in claim 11, wherein said strip is formed of self-winding yieldable spring steel strip and extends along a portion of the length of said belting.

14. A retractable safety belt assembly comprising a support, an elongated flexible belt, an elongated self-retractable strip mounted and extending longitudinally along said belt, and means fixedly securing one end of said belt and said strip to said support to transfer tensile forces imposed on the other end of said belt through the latter to said support independently of said strip.

15. The retractable safety belt assembly as defined in claim 14, wherein said strip is formed of self-winding yieldable spring steel.

16. A retractable safety belt assembly comprising a support, roller means journaled upon said support, an elongated flexible belt, an elongated self-winding strip of yieldable spring steel mounted and extending longitudinally along said belt, and means fixedly securing one end of said belt and said strip to said roller means to transfer tensile forces imposed on the other end of said belt through the latter to said roller means and support independently of said strip, said belt and said strip when not in use being coiled around said roller means.

17. The retractable safety belt assembly as defined in claim 16 wherein said strip of spring steel is transversely arcuate in cross section whereby the coils of said strip are guidably and cooperatively nested for automatic rewind in a single plane substantially perpendicular to the axis of rotation of said roller means.

18. The retractable safety belt assembly as defined in claim 17 wherein said strip extends along only a portion of the length of said belt.

References Cited in the file of this patent

UNITED STATES PATENTS

| | | |
|---|---|---|
| 1,964,280 | Witchger | June 26, 1934 |
| 2,690,985 | Poole | Oct. 5, 1954 |
| 2,856,991 | Princiotta | Oct. 21, 1958 |
| 2,979,417 | Kruger | Apr. 11, 1961 |

FOREIGN PATENTS

| | | |
|---|---|---|
| 820,770 | Great Britain | Sept. 23, 1959 |

UNITED STATES PATENT OFFICE
CERTIFICATE OF CORRECTION

Patent No. 3,163,467                   December 29, 1964

Gordon P. Deneau

It is hereby certified that error appears in the above numbered patent requiring correction and that the said Letters Patent should read as corrected below.

Column 3, line 1, for "mevement" read -- movement --; line 29, for "consist" read -- consists --; line 59, for "assembly" read -- assemble --; column 4, line 6, for "use" read -- same --; line 34, for "directly" read -- indirectly --; line 59, after "spring" insert -- steel --.

Signed and sealed this 1st day of June 1965.

(SEAL)
Attest:

ERNEST W. SWIDER                         EDWARD J. BRENNER
Attesting Officer                           Commissioner of Patents